April 15, 1958

A. BOUWERS ET AL 2,830,494

STEREOSCOPE, IN PARTICULAR FOR THE OBSERVATION OF AIR PHOTOGRAPHS

Filed Sept. 1, 1953

ALBERT BOUWERS AND
G. K. BOX
INVENTORS

BY Wenderoth, Lind & Ponack

ATTYS

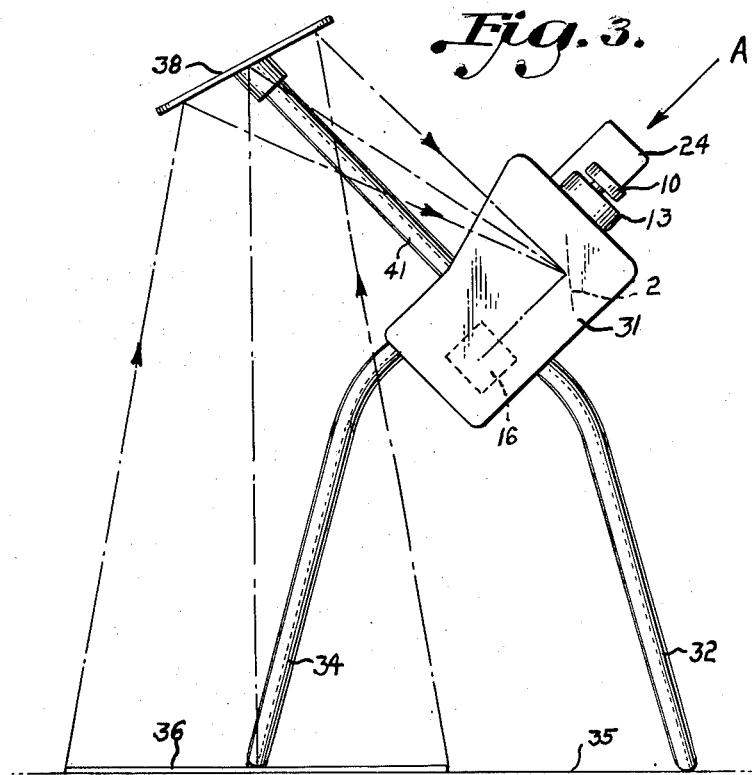
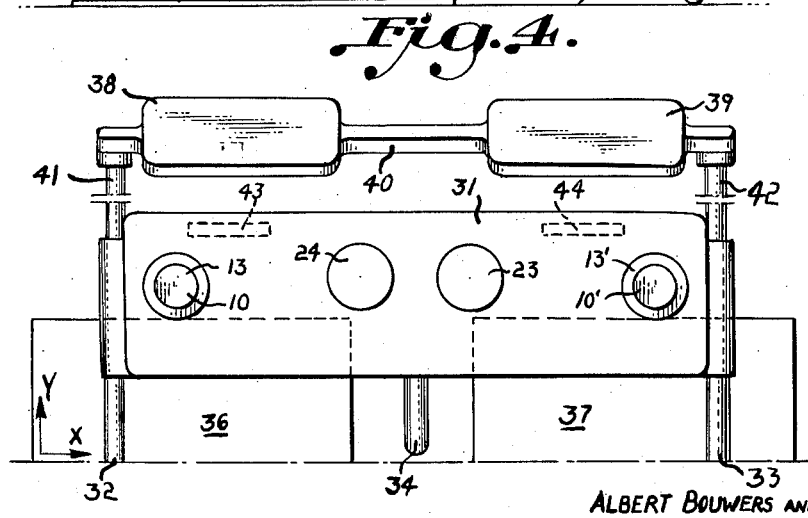
ALBERT BOUWERS AND
G. K. BOX, INVENTORS

ALBERT BOUWERS
AND G. K. BOX
INVENTORS

BY Wenderoth, Lind & Ponack

ATTYS.

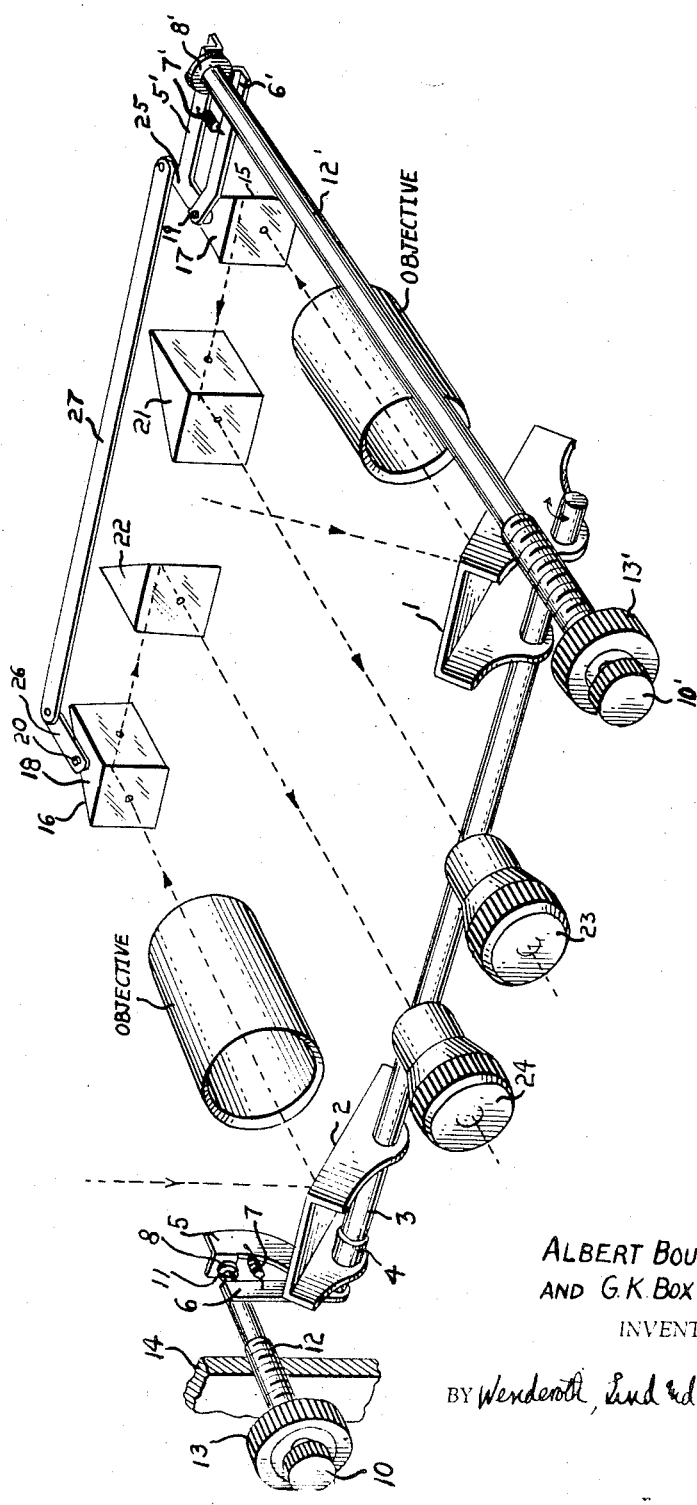

United States Patent Office 2,830,494
Patented Apr. 15, 1958

2,830,494

STEREOSCOPE, IN PARTICULAR FOR THE OBSERVATION OF AIR PHOTOGRAPHS

Albert Bouwers, The Hague, and Gerrit Klaas Box, Voorburg, Netherlands, assignors to N. V. Optische Industrie "de Oude Delft," Delft, Netherlands Application September 1, 1953, Serial No. 377,909

Claims priority, application Netherlands September 5, 1952

3 Claims. (Cl. 88—29)

This invention relates to a stereoscope, and particularly a stereoscope for the observation of aerial photographs. In the stereoscope according to the invention, each half of the stereoscope is provided with an image erecting system for completely erecting an image and consisting of four plane reflecting surfaces. Two of the surfaces are rotatable about an axis which is perpendicular to the plane of incidence of a light tray travelling along the optical axis of the stereoscope on the surface. The axes of the two surfaces in each half which are rotatable are perpendicular to each other. Image erecting systems of this general type are described in the copending sole applications of Albert Bouwers, Serial No. 175,613, filed July 24, 1950, now Patent No. 2,818,773, issued January 7, 1958, and Serial No. 285,705, filed May 2, 1952, and now abandoned.

It is an object of the present invention to provide an improved stereoscope of the above decribed type, in which means is provided to compensate for parallax in a pair of aerial photographs.

It is another object of this invention to improve a stereoscope of the above described type by providing means for an increased depth of field for the scanning of aerial photographs.

The means for compensating for parallax comprises means for adjusting the angle between two corresponding rotatable reflecting surfaces in the two halves of the instrument. This is accomplished by mounting the two reflecting surfaces on a common axis of rotation so that they can both be rotated simultaneously and so that they can be rotated independently of each other. Thus, during the scanning in one direction, e. g. in the y-direction, a parallax in that direction, $\Delta_y$, can be compensated for. With this type of correction possible, the two pictures need not be placed very accurately under the instrument since deviations in the position of the pictures with respect to each other can be compensated for very quickly.

Concerning the depth of field, although this problem arises in any instrument used for the observation of objects close at hand, the problem is much more acute in the stereoscope of the present invention, because of the artifical enlargement of the field of view by means of the rotatable reflecting surfaces. As a result, the depth of field of the optical system is very small, especially in the case of greater enlargement, so that during the viewing of the photographs, the focusing of the objective or eyepieces would, in the absence of the improvement, have to be changed each time a different part of the photograph is viewed. This is of course a great disadvantage, not only because additional movements on the part of the observer must take place, but because the concentration on focusing the stereoscope again and again during the course of observation of a photograph detracts from concentration on the photograph itself.

In the stereoscope according to the invention, the object distance is artificially enlarged to such an extent that the definition is sufficient to permit observation of the whole field of view without the focus of the stereoscope having to be altered. The enlargement of the object distance is achieved by arranging the reflecting surface in each half of the instrument which is first met by the rays of light coming from the photograph in a position outside of the housing containing the remainder of the reflecting surfaces.

In the drawings:

Fig. 3 is a side elevation view of the stereoscope according to the invention in position to view an aerial photograph;

Fig. 4 is a view of the stereoscope as shown in Fig. 3 from the direction of the arrow A in Fig. 3;

Fig. 6 is a perspective view of the parts of the image erecting system and the means for correcting the position of the rotatable reflecting surfaces relative to each other.

Figure 1:
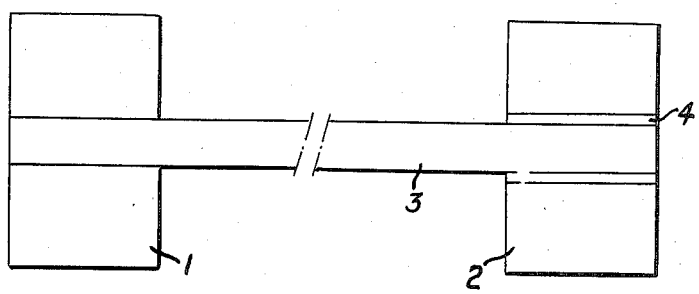
Fig. 1 is a schematic view of two reflecting surfaces, one in each half of the stereoscope, as they are mounted on a common axis of rotation, and mounted for rotation relative to each other.
Figure 2:
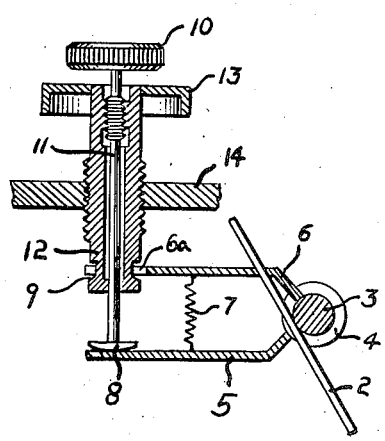
Fig. 2 is a sectional view of the means for rotating one reflecting surface relative to each other and for rotating two reflecting surfaces together.

As seen in Fig. 1, one reflecting surface 1 in one half of the stereoscope is mounted rigidly on a shaft 3 and the corresponding reflecting surface 2 in the other half of the stereoscope is rotatably mounted on the shaft 3 by means of a sleeve 4. The mechanism of Fig. 2 is utilized to rotate the mirrors 1 and 2 either simultaneously or relative to each other. A first lever 5 is attached to the sleeve 4 and a second lever 6 is attached to the shaft 3. The free ends of the levers extend substantially parallel to each other. A spring 7 is mounted between the two levers and tends to urge them toward each other. A hollow shaft 12 is threaded into the wall 14 of the housing 31 for the stereoscope and has a knob 13 on the end outside of the housing and a groove 9 in the other end thereof. The groove 9 is engaged in an aperture 6a in the lever 6. Within the hollow shaft 12 is a spindle 11 with a knob 10 on the end thereof which projects from the knob 13. A bearing disc 8 is mounted on the other end of the spindle 11, and the spindle is threadedly mounted within the hollow shaft 12. The spring 7 keeps the lever 6 against the side of the groove 9 towards the end of the shaft 12, and keeps the lever 5 against the bearing disc 8.

In operation, rotation of the spindle 11 in one direction will urge the levers 5 and 6 away from each other, thus rotating shaft 3 and sleeve 4 relative to each other. This causes movement of the reflecting surfaces 1 and 2 relative to each other for correcting parallax between them. During this movement, the spring 7 always keeps the ends of the levers against the groove 9 and the bearing disc 8. Conversely, rotation of the spindle 11 in the other direction will move levers 5 and 6 toward each other. On the other hand, rotation of the shaft 12 in one direction will cause movement of both levers, the lever 6 being engaged by the other side of the groove 9 and the lever 5 being moved by the bearing disc 8 on the spindle 11 which is carried along by the shaft 12 during its movement. This movement causes simultaneous movement of both of the reflecting surfaces 1 and 2. Conversely, movement of shaft 12 in the other direction causes rotation of both levers, lever 6 again being engaged by the groove 9 and the spring 7 holding lever 5 against the bearing disc 8 on spindle 11.

The coaxial arrangement of knobs 10 and 13 makes the operation of the stereoscope very simple, since during the viewing of the photographs the position of the hand and arm of the viewer need not be changed to make the different adjustments.

The manner in which the mechanisms for simultaneous and relative movement of the reflecting surfaces are incorporated in the stereoscope according to the invention is shown in Fig. 6. Within the housing 31 of the stereoscope each erecting system consists of three reflecting surfaces, the fourth reflecting surface which is the first to receive the image from the photographs being mounted outside of the housing. Corresponding reflecting surfaces 1 and 2 are shown mounted on shaft 3 and receive the light rays from the fourth reflecting surfaces outside the housing. Reflecting surfaces 1 and 2 reflect the light rays through objectives to reflecting surfaces 15 and 16 in prisms 17 and 18. These prisms are mounted on parallel rotatable shafts 19 and 20. Light rays from these prisms are reflected into prisms 21 and 22 and then into eye pieces 23 and 24 mounted in the wall of the housing. In the embodiment shown the reflecting surfaces 1 and 2 are arranged to scan the photographs in the y-direction and the reflecting surfaces 15 and 16 are arranged to scan in the x-direction.

In order to move the reflecting surfaces 1 and 2 to scan the photographs in the y-direction and correct for parallax $\Delta_y$, the mechanism as shown in Fig. 2 is incorporated in the stereoscope exactly as shown. In order to move the reflecting surfaces 15 and 16, a slight modification of the mechanism is necessary. In Fig. 6, the mechanism for moving the reflecting surfaces 15 and 16 has been numbered with primed reference numerals for the parts of the mechanism which correspond to the mechanism for moving the reflecting surfaces 1 and 2. Instead of having a reflecting surface fixed to the collar 4' however, there is a lever 25. The lever 5' and the lever 25 form a bell crank. There is a corresponding lever 26 attached to the shaft 20 forming the axis about which the prism 18 is rotatable, and the levers 25 and 26 are linked by a link 27. Thus movement of the knob 13' moves both levers 5' and 6' which in turn rotate the shaft 19 forming the axis about which prism 17 is rotatable as well as the lever 25, link 27, lever 26 and shaft 20 on which prism 18 is mounted. Likewise movement of knob 10' will move only levers 5', 25, link 27, lever 26 and shaft 20, thus moving reflecting surface 16 relative to reflecting surface 15.

The manner in which the object distance is enlarged is shown in Figs. 3 and 4. The housing 31 is mounted on three legs 32, 33 and 34. On a supporting surface 35 is placed a pair of photographs 36 and 37 which are to be viewed stereoscopically. Rods 41 and 42 extend from the housing 31 out over the photographs, and a rod 40 is mounted between the ends of the rods 41 and 42. On the rod 40 are the fourth reflecting surfaces of the image erecting systems, reflecting surfaces 38 and 39. These are positioned to receive light reflected from the photographs and reflect it into the housing 31 through apertures 43 and 44 therein to the reflecting surfaces 1 and 2.

In a preferred embodiment of the stereoscope according to the invention, the distance of the reflecting surface 38 and 39 above the photographs is 42 cm. The distance between the reflecting surfaces 38 and 39 is 7 cm. and the housing 31 for the stereoscope need by only 9 x 14 x 34 cm. Photographs up to 30 cm. by 30 cm. can be viewed, which photographs have been made with an overlapping of 60%. This makes the stereoscopic field of view 18 cm. by 30 cm.

Rods 41 and 42 as well as legs 32, 33 and 34 can be removed from the housing 31 and all of the parts packed in a convenient case for easy transport.

Figure 5:
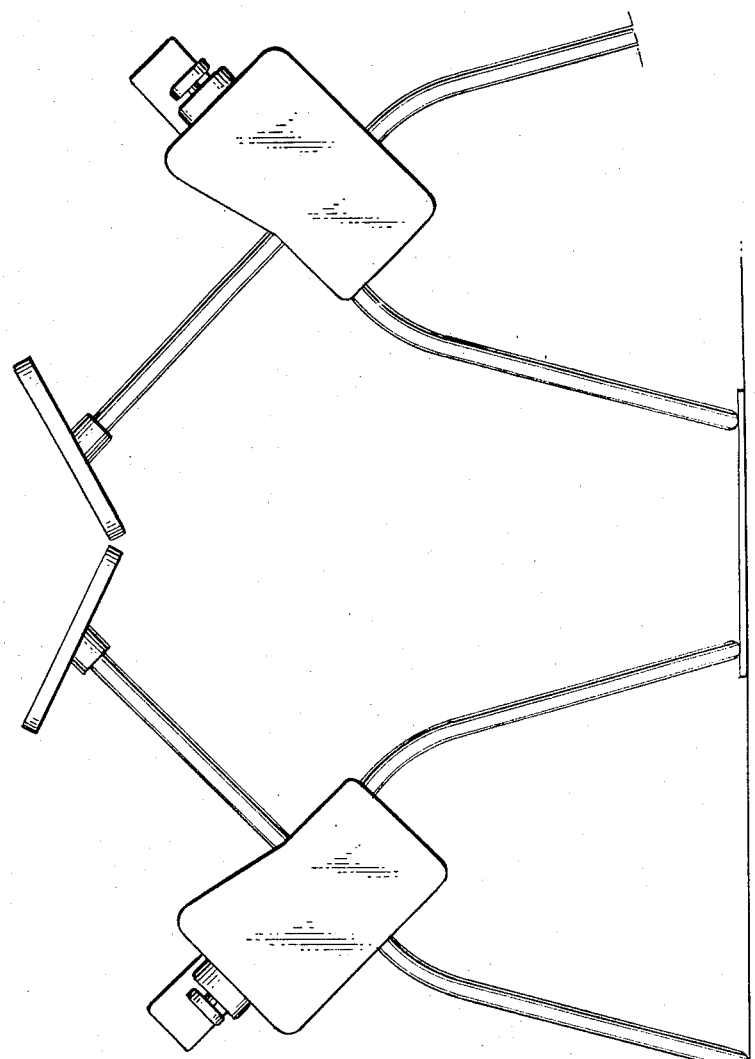
Fig. 5 is a side elevation view of two stereoscopes according to the invention in position to view the same aerial photograph simultaneously.

As shown in Fig. 5, the stereoscope can be positioned over the photographs in conjunction with a similar stereoscope so that the same pair of photographs can be viewed by two stereoscopes. In this way two viewers can easily focus on the same pair of photographs, which is valuable for instruction or discussion purposes.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. A binocular stereoscope, particularly for the observation of aerial photographs, comprising a housing, two identical symmetrically disposed image erecting systems each having four plane reflecting surfaces arranged along an optical axis, the ends of the optical axis of the two systems being parallel to each other, at least one rod mounted on said housing, the first reflecting surface in each system being fixed on said rod in a position to be met first by the light rays reflected from a photograph being observed, the remaining three surfaces in each system being mounted in said housing, one of the remaining three reflecting surfaces in one system and the corresponding reflecting surface in the other system being mounted in said housing for simultaneous rotation about an axis perpendicular to the plane of incidence of a light ray travelling along the optical axis and reflected from said surfaces and said one of said remainder of reflecting surfaces in one system being mounted for rotation relative to the corresponding reflecting surface in the other system, a second reflecting surface of the remaining three reflecting surfaces in one system and the corresponding reflecting surface in the other system being mounted in said housing for simultaneous rotation about an axis perpendicular to the plane of incidence of a light ray travelling along the optical axes of said systems and reflected from said surfaces and also perpendicular to the axis about which said one reflecting surface and the reflecting surface corresponding to said one surface is rotatable, and said second reflecting surface being mounted for rotation relative to the corresponding reflecting surface in the other system, a plurality of hand operated members movably mounted on said housing, means for connecting one of a portion of said plurality of members to said one of the remaining three reflecting surfaces and the corresponding reflecting surface for simultaneous rotation of said reflecting surfaces, means for connecting another of said portion of said members to said one of the remaining three reflecting surfaces for rotating said one reflecting surface relative to the corresponding reflecting surface in the other system, means for connecting one of the remainder of said plurality of members to said second reflecting surface and the corresponding reflecting surface in the other system for simultaneous rotation of said reflecting surfaces, and means for connecting another of the remainder of said members to said second reflecting surface for rotation of said second reflecting surface relative to the corresponding reflecting surface in the other system.

2. A stereoscope as claimed in claim 1 in which said means for rotating said corresponding reflecting surfaces simultaneously and for rotating one surface of each pair relative to the other comprise a housing for said rotatably mounted reflecting surfaces, a hollow shaft threaded into said housing, a knob on said shaft for rotating said shaft, a stem threaded into said shaft, a knob on said stem for rotating said stem relative to said shaft, shafts rotatably mounted within said housing on which said corresponding reflecting surfaces are mounted, lever means connected to said shafts, the end of said hollow shaft engaging said lever means for simultaneous movement of said shafts and the end of said stem engaging said lever means for movement of one of said shafts relative to another of said shafts.

3. A stereoscope as claimed in claim 1 in which said means for rotating said corresponding reflecting surfaces simultaneously and for rotating one surface of each pair relative to the other comprise a housing, a shaft mounted in said housing on which one of said surfaces is fixed, a sleeve rotatably mounted on said shaft to which the other of said surfaces is fixed, a first lever attached to said shaft for rotating said shaft, a second lever attached to said sleeve for rotating said sleeve, the free ends of said levers extending parallel to each other, spring means attached between said parallel ends of said levers urging said levers toward each other, a first knob having a hollow shaft extending therefrom attached to said first lever and mounted in said housing, and a second knob having a spindle extending therefrom adjustably mounted within the hollow shaft of said first knob, and bearing against the free end of said second lever, whereby on rotation of said first knob said first and second levers are moved to rotate said shaft and said sleeve simultaneously, and when said second knob is rotated, said second lever rotates said sleeve relative to said shaft.

References Cited in the file of this patent

UNITED STATES PATENTS

| | | |
|---|---|---|
| 1,679,661 | Hugershoff | Aug. 7, 1928 |
| 1,756,062 | Holst | Apr. 29, 1930 |
| 2,303,099 | Wernstedt | Nov. 24, 1942 |
| 2,625,853 | Hayward | Jan. 20, 1953 |
| 2,625,854 | Hayward | Jan. 20, 1953 |
| 2,670,655 | Buckmaster | Mar. 2, 1954 |

FOREIGN PATENTS

| | | |
|---|---|---|
| 267,594 | Great Britain | Mar. 16, 1927 |
| 497,413 | Belgium | Dec. 1, 1950 |